(12) United States Patent
Anelli et al.

(10) Patent No.: US 8,768,126 B2
(45) Date of Patent: Jul. 1, 2014

(54) UNDERWATER OPTICAL FIBRE CABLE

(75) Inventors: Pietro Anelli, Milan (IT); Vincenzo Crisci, Milan (IT); Giovanni Pozzati, Milan (IT); Rodolfo Sica, Milan (IT)

(73) Assignee: Prysmian S.p.A., Milan (IT)

( * ) Notice: Subject to any disclaimer, the term of this patent is extended or adjusted under 35 U.S.C. 154(b) by 190 days.

(21) Appl. No.: 13/515,430

(22) PCT Filed: Dec. 22, 2009

(86) PCT No.: PCT/IB2009/055899
§ 371 (c)(1),
(2), (4) Date: Aug. 2, 2012

(87) PCT Pub. No.: WO2011/077186
PCT Pub. Date: Jun. 30, 2011

(65) Prior Publication Data
US 2012/0308185 A1    Dec. 6, 2012

(51) Int. Cl.
*G02B 6/44* (2006.01)
(52) U.S. Cl.
USPC ............................................................ 385/109
(58) Field of Classification Search
None
See application file for complete search history.

(56) References Cited

U.S. PATENT DOCUMENTS

| | | |
|---|---|---|
| 4,091,291 A | 5/1978 | Foster et al. |
| 4,389,088 A | 6/1983 | Trezequet |
| 4,974,926 A | 12/1990 | Blee et al. |
| 5,362,921 A | 11/1994 | Birkelund et al. |
| 6,012,495 A | 1/2000 | Antonsen |

FOREIGN PATENT DOCUMENTS

| | | |
|---|---|---|
| DE | 100 21 994 A1 | 11/2001 |
| EP | 0 136 877 A1 | 4/1985 |
| EP | 0 493 796 A1 | 7/1992 |
| FR | 2 728 970 A1 | 7/1996 |

OTHER PUBLICATIONS

English-language International Search Report and Written Opinion of the International Searching Authority issued by the European Patent Office in International Application No. PCT/IB2009/055899 (12 pages).
Norscan Report, "Cathodic Protection Theory", vol. 2, Issue 2, pp. 1-6, (Aug. 2008).

*Primary Examiner* — Sung Pak

(74) *Attorney, Agent, or Firm* — Finnegan, Henderson, Farabow, Garrett & Dunner, L.L.P.

(57) ABSTRACT

An underwater optical fiber cable includes two end portions, an extruded metal tube, at least one optical fiber and a polymeric sheath surrounding the extruded metal tube. The at least one optical fiber is housed in loose configuration in the extruded metal tube. The cable includes a controlled cathodic protection system connected to one of the end portions of the underwater cable and includes an anode bed arranged outside the underwater cable and an electric connection connecting the anode bed to the extruded metal tube of the underwater cable at one of the end portions of the underwater cable.

23 Claims, 7 Drawing Sheets

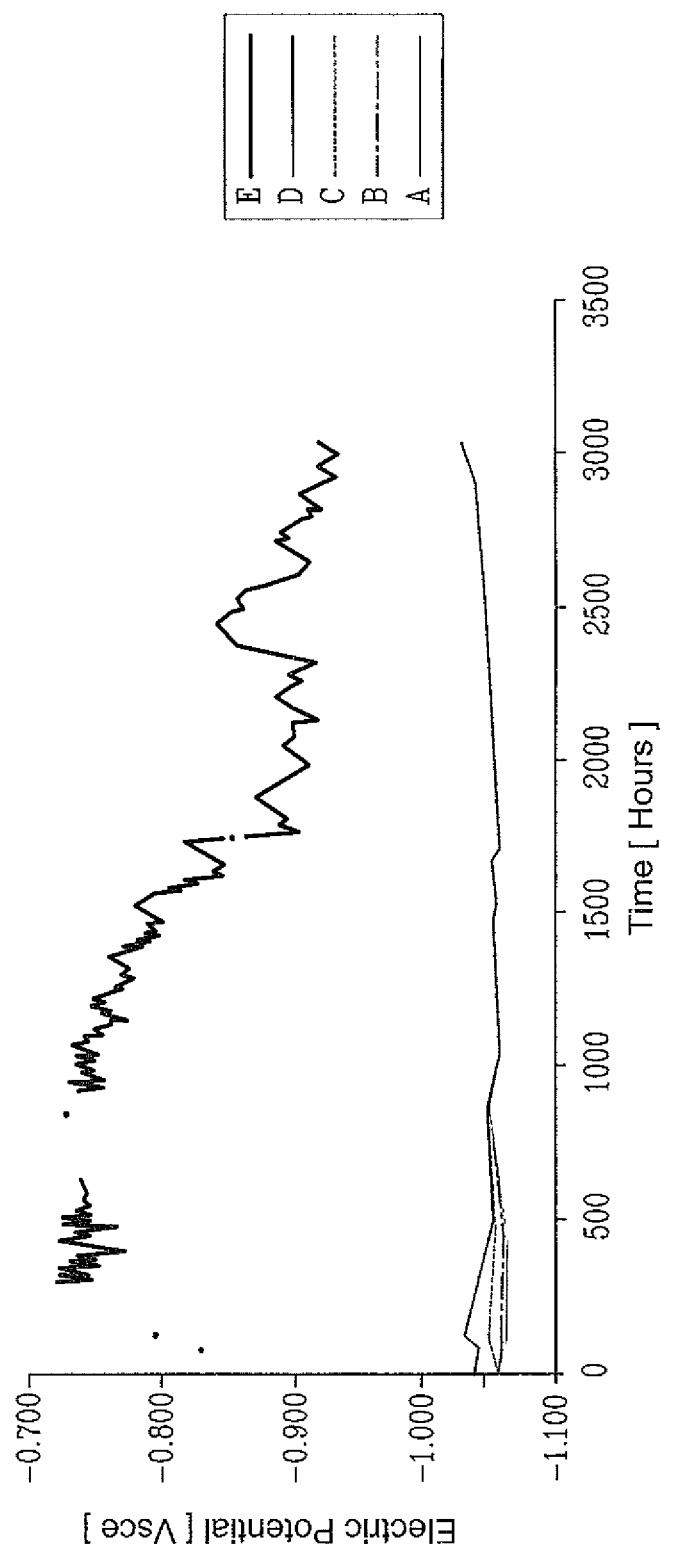

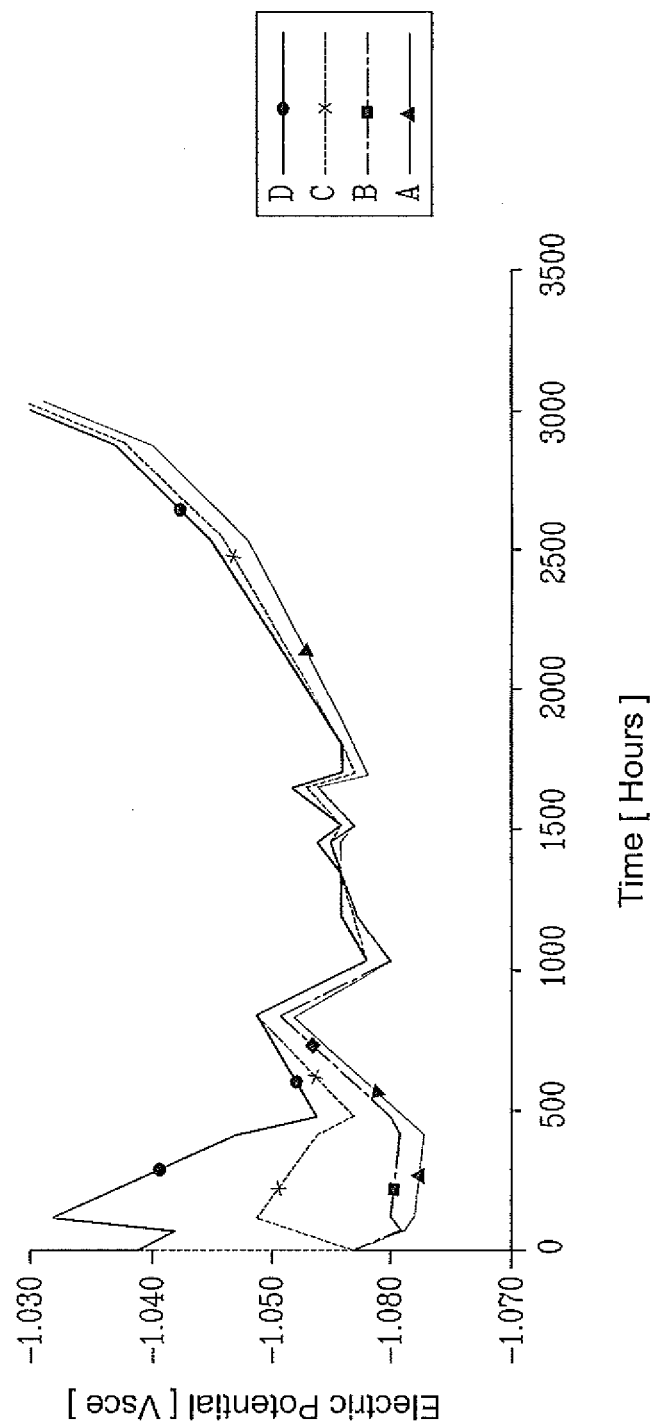

UNDERWATER OPTICAL FIBRE CABLE

CROSS REFERENCE TO RELATED APPLICATION

This application is a national phase application based on PCT/IB2009/055899, filed Dec. 22, 2009, the content of which is incorporated herein by reference.

TECHNICAL FIELD

The present invention relates to an underwater optical fibre cable and to a method for protecting an underwater optical fibre cable.

An underwater optical fibre cable is an optical cable installed or suitable to be installed underwater, e.g. on the seabed, crossing rivers, lakes or the like, where the cable is submersed in water at least for a portion of its length.

BACKGROUND ART

Underwater cables, in particular underwater optical fibre cables, are used for undersea communications. The underwater optical fibre cables are laid on the seabed and have landing points.

U.S. Pat. No. 4,389,088 relates to an underwater optical fibre cable including a central filament provided with helical grooves for receiving at least one optical fibre in each groove, the groove cross-section being such that an optical fibre therein can move transversally by at least half of its transversal dimension, wherein said central filament is made of a metal or a metal alloy. The central filament has an aluminium tube, applied by extrusion or by longitudinally welding a tape followed by drawing through a die. The function of such a tube is to protect the optical fibres from the effects of the outside pressure. In its turn, the tube is covered by an extrusion technique by a covering which is several millimeters thick and made of a plastics material such as polyethylene or polypropylene, so as to provide electrical insulation with respect to the outside medium. A layer of steel wires helically wound in contiguous turns surrounds the covering. The aim of such wires is simultaneously to absorb the tensile forces exerted on the cable and to form armouring capable of withstanding compression which results from outside pressure. The cable may optionally include another metal protection layer.

The Applicant observed that a cable according to U.S. Pat. No. 4,389,088, when is installed on the seabed in saltwater, it is subject to extreme environment which is corrosive for the components of the cable, especially for the metallic components.

The corrosion of the metallic components of the cable is dangerous because reduces the mechanical resistance of the cable and the water may finally reach the optical fibres. Moreover in acidic and neutral waters the cathodic reaction that generates the corrosion produces hydrogen that induces attenuation at the operating wavelengths of the optical fibres.

From the Norscan Report (August 2008, volume 2, issue 2) it is known that, in order to protect the armour of an optical fibre cable from a corrosion effect, a negative DC Voltage (Direct Current Voltage) linked to the cable armour is applied. When exposed armour areas of the cable come in contact with local ground, elements in the surrounding installation area will be attracted to the negatively charged exposed cable area. These elements will build up over time, forming a protective layer on the exposed cable armour as long as the negative DC potential is energizing the cable, thus slowing the corrosion process of the exposed armour area.

The Applicant has observed that the impressed current can cause hydrogen generation in the cable.

According to EP136877 a submarine cable comprises a cable core which is arranged within a protective sheath and provided with one or more layers of metallic armour. The armour is usually covered with a corrosion-protective layer of jute and/or polypropylene yarn impregnated with asphalt and/or bitumen. When the armour consists of steel wires or bands the steel is usually galvanised. Other metals are, however, also been used as cable armour. In connection with single conductor power cables, the conductivity of the steel armour has been improved by introducing wires of different metals into the armour.

This submarine cable is characterised in that integrated into the armour there are arranged wires, bands or tapes of a metal or metal alloy which is less precious than that of the armour, and which will represent a sacrificial anode for corrosion protection of the armour.

SUMMARY OF THE INVENTION

Within the present invention, the Applicant faced the problem of protecting an underwater optical fiber cable from corrosion effects. In addition, also the Applicant faced the problem of protecting the optical fibres from hydrogen generation, associated with the electrochemical reactions of the cable components.

In particular the Applicant observed that the integrity of the metal tube housing the optical fibres influences the efficiency of the cable.

According to a first aspect, the present invention relates to an underwater optical fibre cable comprising:

two end portions, an extruded metal tube, at least one loosely housed optical fibre within the extruded metal tube, a polymeric sheath surrounding the extruded metal tube and a controlled cathodic protection system, comprising an anode bed arranged outside the underwater cable and an electric connection connecting the anode bed to the extruded metal tube of the underwater cable at one of the end portions of the underwater cable.

The improved resistance of the extruded metal tube protected by a polymeric sheath may be preserved by a cathodic protection system suitable for applying a controlled protection current to the extruded metal tube.

The Applicant has found that the cathodic protection system with an anode bed arranged outside the underwater cable is easy to install and to maintain, taking advantage of the more accessible portion of the cable, and extends the protection along the length of the cable.

Depending on the length of the underwater cable, in an embodiment a controlled cathodic protection system is positioned at both ends of the underwater cable. Each portion is linked to an anode bed arranged outside the underwater cable and an electric connection connecting the anode bed to the extruded metal tube of the underwater cable at the related end portion of the underwater cable.

Preferably the underwater cable comprises at least one adhesive layer disposed between the extruded metal tube and the polymeric sheath.

The adhesive layer improves the adhesion between the extruded metal tube and the polymeric sheath. Moreover the adhesive layer contributes to avoid damages within the polymeric sheath and, in case of damages, avoids the corrosion propagation.

Advantageously the adhesive layer comprises maleic anhydride grafted polyethylene.

Preferably a predetermined electrical resistance suitable for maintaining the value of the protection current density J between 0.001 A/m² and 1 A/m² is arranged between the anode bed and the extruded metal tube. More preferably the predetermined electrical resistance is suitable for maintaining the value of the protection current density J between 0.005 A/m² and 0.1 A/m². Still more preferably the predetermined electrical resistance is suitable for maintaining the value of the protection current density J between 0.008 A/m² and 0.05 A/m².

Advantageously the predetermined electrical resistance is arranged in series along the electrical connection. The predetermined electrical resistance allows limiting hydrogen generation and to safely apply the cathodic protection obtaining a reliable protection of the optical fibres.

The extruded metal tube is protected and the hydrogen generation is limited by a controlled cathodic protection system.

Preferably the underwater cable comprises a polymeric tube housing said at least one optical fibre within said extruded metal tube. This feature provides for a further protection of the optical fibre within the extruded metal tube.

Advantageously the extruded metal tube is the metallic element closest to the at least one optical fibre starting from the centre of the cable. Therefore the cathodic protection is applied directly to the metal component of the cable which houses the at least one optical fibre, optimizing protection of cable stretches without armour layer.

Preferably the extruded metal tube is made of aluminium. Alternatively the extruded metal tube is made of aluminium alloy. Alternatively the extruded metal tube is made of copper.

Advantageously at least a portion of the underwater cable comprises at least one layer of armour wires surrounding the polymeric sheath. At least one polymeric protective layer surrounds the armour wires. The armour layer/s provide for a further mechanical resistance of all the cable in particular during laying.

Advantageously the controlled cathodic protection system is a galvanic cathodic protection system and includes an anode bed which comprises at least one sacrificial anode made of a material with a more negative electrode potential than the extruded metal tube of the underwater cable. The design of the cable and the galvanic controlled cathodic protection system according to the present invention provide for a reliable protection of the optical fibres.

Preferably, in case the extruded metal tube is made of aluminium, or aluminium alloy, the anode bed is made of a material selected from the group consisting of zinc, magnesium, aluminium or aluminium alloy.

Alternatively the controlled cathodic protection system is an impressed current cathodic protection system comprising an external power source disposed along the electric connection between the anode bed and the extruded metal tube of the underwater cable.

Advantageously the controlled cathodic protection system comprises an electric resistance in series along the electric connection between the anode bed and the extruded metal tube and a voltmeter measuring electric potential difference at the ends of the resistance.

These features allow obtaining a reliable continuous reading of the electric potential difference between the extruded metal tube and the anode bed.

Advantageously the extruded metal tube is corrugated. Preferably the extruded metal tube comprises an exposed stretch at least at the end portion of the underwater cable connected to the cathodic protection system. In particular the electric connection connects the anode bed to the exposed stretch of the extruded metal tube. Moreover the cathodic protection system offers a direct contact between the electric connection and the extruded metal tube.

Advantageously a joint case houses the exposed stretch of the extruded metal tube. The electric connection passes through the joint case. The joint case housing the exposed stretch of the extruded metal tube protects the end portion of the cable, and in particular the exposed stretch of the extruded metal tube. In this case the electric connection passes through the joint case allowing the anode bed to be disposed outside the joint case.

Advantageously the end portion of the underwater cable provided with the cathodic protection system is located by a shore. The anode bed is suitable for being buried in the shore under water level.

Preferably the anode bed is buried with hydrophilic backfill. This feature allows improving the contact between the anode bed and the environment, particularly the sea water.

Advantageously the anode bed can comprise two or more sacrificial anodes connected in parallel to a link box. Particularly the link box is connected to the extruded metal tube of the underwater cable by means of the electric connection. Therefore the anode bed may be easily designed for each type of protection required. Preferably the external power source of the impressed current cathodic protection system comprises an AC or DC powered rectifier having a positive terminal connected to the anode bed, a negative terminal connected to the extruded metal tube of the underwater cable and a further terminal connected to a reference electrode.

Preferably the AC or DC powered rectifier comprises a comparing device which compares the electric potential difference between the reference electrode and the extruded metal tube with a reference value.

Preferably the controlled cathodic protection system comprises a 1Ω electric resistance in series along the electric connection between the anode bed and the extruded metal tube.

A further aspect of the present invention relates to a method for protecting an underwater optical fibre cable in which an underwater cable has two ends portions and comprises an extruded metal tube, at least one loosely housed optical fibre within the extruded metal tube and a polymeric sheath surrounding the extruded metal tube, the method for protecting comprising:

providing for a cathodic protection system suitable for applying a protection current to the extruded metal tube, connecting one anode bed to the extruded metal tube of the underwater cable at least at one of the end portions of the underwater cable by means of an electric connection, the anode bed being arranged outside the underwater cable, checking the presence of defect of the polymeric sheath.

The check can be performed without interruptions being constantly applicable to the cable structure which does not need to be modified in order to perform the check. The Applicant observed that the check of the presence of defect of the polymeric sheath allows checking the sacrificial anode corrosion in a controlled cathodic protection method, particularly a galvanic controlled cathodic protection method.

Advantageously the method for protecting an underwater optical fibre cable comprises evaluating the electric current supplied by the anode bed. The Applicant observed that in a controlled cathodic protection method, preferably a galvanic protection method, the electric current supplied by the anode bed is linked to the presence of defect of the polymeric sheath Preferably it is provided for evaluating the electric current supplied by the anode bed starting from an average electric potential difference between the anode bed and the extruded metal tube. The Applicant observed that these features allow obtaining a reading without interrupting the earth connection of the cable.

In particular the method for protecting an underwater optical fibre cable comprises:

reading the electric potential difference between the anode bed and the extruded metal tube, processing the electric potential differences of a predetermined period to obtain an average value of the electric potential difference, and processing the average value of the electric potential difference to obtain the value of the electric current supplied by the anode bed.

The checking of the polymeric sheath may be performed on the base of the average value of the electric potential difference between the extruded metal tube and the anode bed. This average value can be obtained directly from the installed cable without modifications and interruptions of the earth connection of the cable. Preferably the method for protecting an underwater optical fibre cable comprises:

reading the electric potential difference between the anode bed and the extruded metal tube.

Advantageously the method for protecting an underwater optical cable comprises:

subtracting a continuous value related to the geological composition of the environment at the two end portions of the underwater cable. This allows eliminating constant errors due to the different geological composition of the environment at the two end portions of the underwater cable.

Advantageously the method for protecting an underwater optical fibre cable comprises:

processing the electric potential differences of a predetermined period of at least two weeks to obtain an average value of the electric potential difference. An average value of at least two weeks allows eliminating variation of the electric potential difference due to the environment (i.e. high/low tide).

In case the method for protecting comprises reading the electric potential difference between the anode bed and the extruded metal tube, advantageously the cathodic protection method comprises selecting the values of the electric potential difference between the anode bed and the extruded metal tube with a predetermined frequency. Otherwise the method for protecting comprises: reading the electric potential difference between the anode bed and the extruded metal tube with a predetermined frequency. This allows eliminating variation of the electric potential difference due to the environment (i.e. sea fluctuations).

BRIEF DESCRIPTION OF THE DRAWINGS

The invention will be further illustrated with reference to the following examples and figures, wherein:

FIG. 6 is a graph of the values of electric potential (V) with respect to a saturated calomel reference electrode of the sacrificial anode and the extruded metal tube on the time (Hours) read during an experiment test;

FIG. 6a is an enlarged portion of the graph of FIG. 6;

DETAILED DESCRIPTION OF THE PREFERRED EMBODIMENTS

Figure 3:
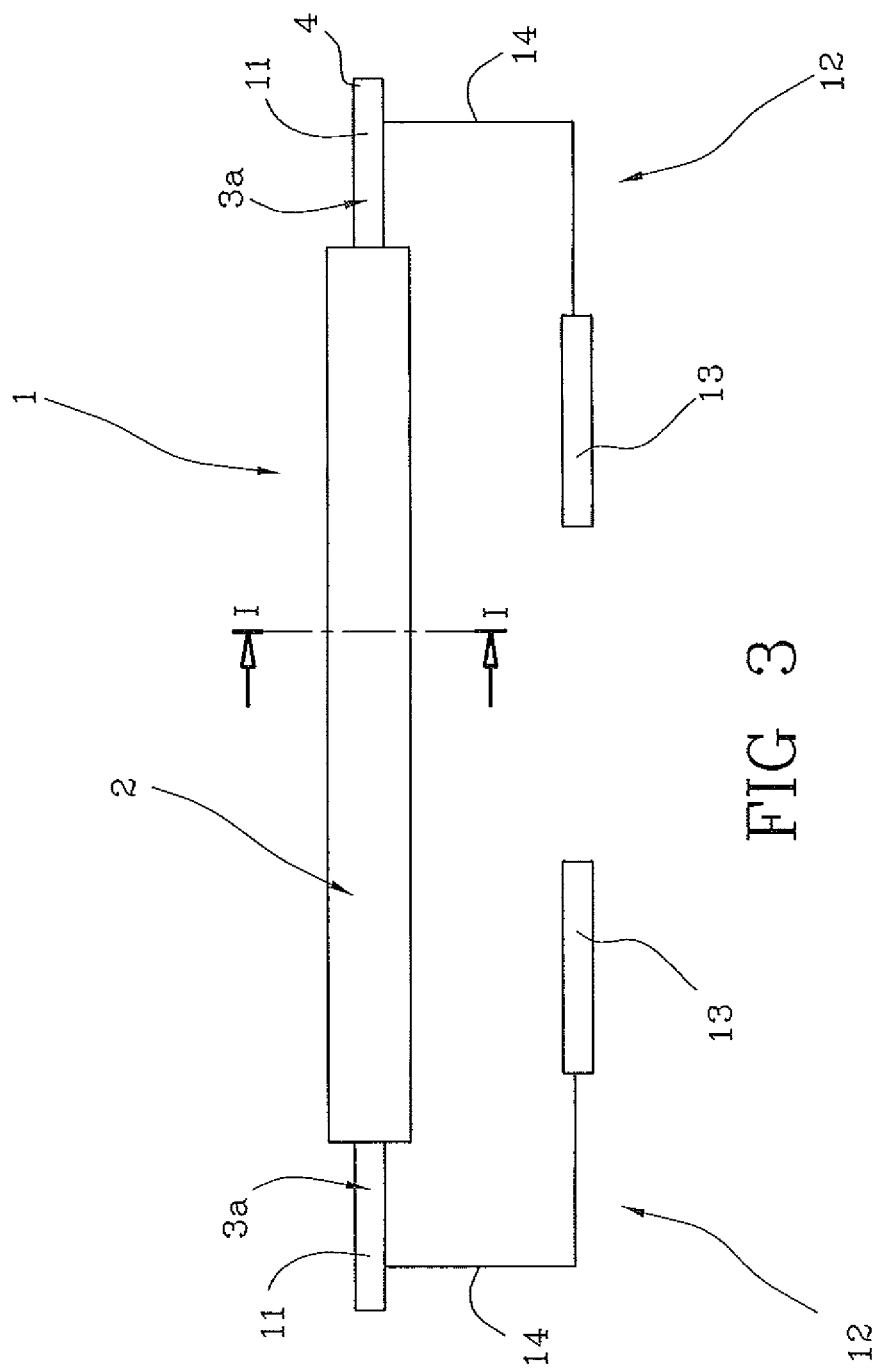
FIG. 3 is a schematic view of an example of an underwater optical fibre cable with a galvanic cathodic protection system.

In FIG. 3, an underwater optical fibre cable 2 according to the invention is shown.

The underwater optical fibre cable 2 has two end portions 3a, 3b. The term "underwater optical fibre cable" means a cable comprising at least one optical fibre and disposed or suitable to be disposed under the water (sea, rivers, lakes, . . . ).

When the underwater optical fibre cable 2 is submersed in seawater at least for a portion of its length it is located in an aggressive environment in which the cable and the environment form an electrolytic cell, where the electrolyte is formed by the sea water. Hereinafter the term "electrode potential" is particularly referred to the environment in which the sea water forms the electrolyte. The underwater optical fibre cable 2, hereinafter cable 2, comprises an extruded metal tube 4. At least one optical fibre, preferably a bundle of optical fibres 5 are housed in loose configuration in the extruded metal tube 4. The bundle of optical fibres can be embedded in a filler material.

A polymeric sheath 6 surrounds the extruded metal tube 4.

An extruded metal tube has a number of surface defects minor than a tube obtained by bending and welding of a metal layer. In fact in the welded points can be present some defects, peculiar of the welding process, and stresses that reduce the resistance of the tube. The extruded metal tube improves resistance to corrosion. Moreover the reduced amount of surface defects limits hydrogen permeability of the metal tube housing the optical fibres.

Figure 1:
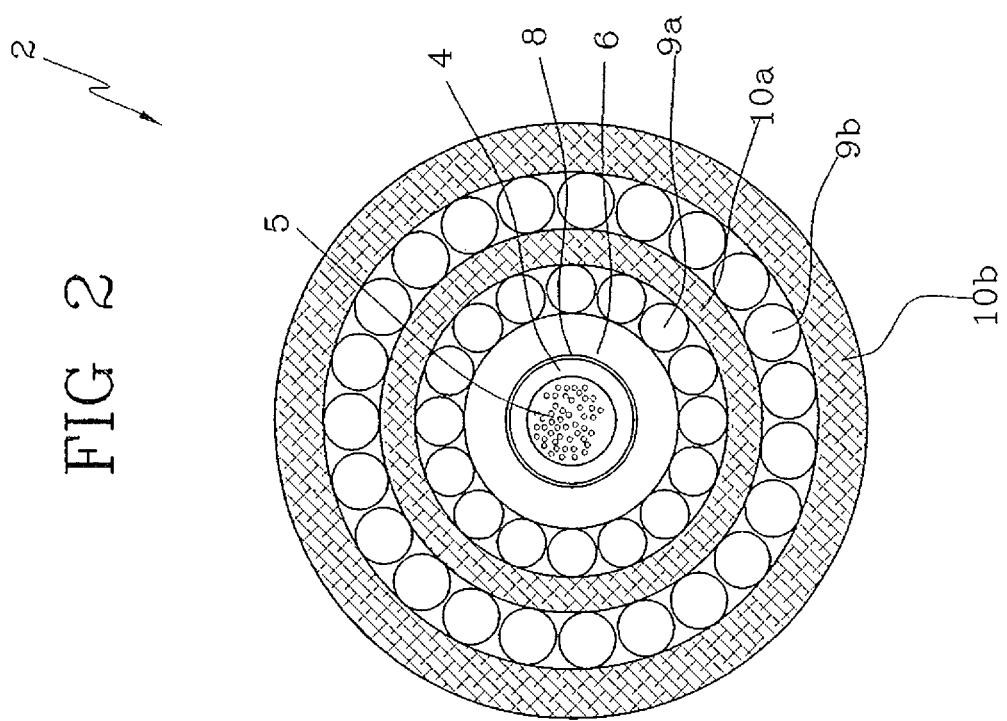
FIG. 1 is a schematic cross section of an example of an underwater optical fibre cable along line I-I of FIG. 3.

In FIG. 1 an example of a cross section of the cable of the invention is shown. The cross section is preferably related to a central portion of the cable as shown in FIG. 3.

The cable 2 can comprise, from the centre to the periphery, at least one or more optical fibres. In the depicted embodiment cable 2 comprises a plurality of optical fibres 5, preferably provided in a bundle, housed in a polymeric tube 7 sequentially surrounded by an extruded metal tube 4 and by a polymeric sheath 6 the extruded metal tube 4.

The discussion below is made with specific reference to a bundle of optical fibres 5, but it can apply to a plurality of optical fibres 5 provided in a different configuration or to a single optical fibre 5.

The polymeric sheath 6 can be made of a homopolymer material. Alternatively the polymeric sheath 6 can be made of a copolymer material. Preferably the polymeric sheath is made of polyethylene sheath. More preferably the polymeric sheath is made of HDPE (High density polyethylene).

According to FIG. 1, the extruded metal tube 4 houses the optical fibres 5 housed within the polymeric tube 7. The optical fibres are loosely housed within the extruded metal tube, without any structural element like polymeric or metallic structure.

The cable 2 can comprise at least one adhesive layer 8 disposed between the extruded metal tube 4 and the polymeric sheath 6. For example the adhesive layer comprises maleic anhydride grafted polyethylene.

For example the extruded metal tube 4 can be made of aluminium. Alternatively the extruded metal tube 4 can be made of copper.

Optionally the cable 2 comprises at least one layer of armour wires surrounding the polymeric sheath 6. Preferably the armour wires are galvanized steel wires. The cable 2 comprises at least one polymeric protective layer surrounding the armour wires. According to the example of FIG. 1, the cable 2 comprises a first layer of armour wires 9a, a first polymeric protective layer 10a surrounding the first layer of armour wires 9a, a second layer of armour wires 9b surrounding the first polymeric protective layer 10a, and a second polymeric protective layer 10b surrounding the second layer of armour wires 9b.

Preferably the polymeric protective layer/s is made of polypropylene.

Figure 2:
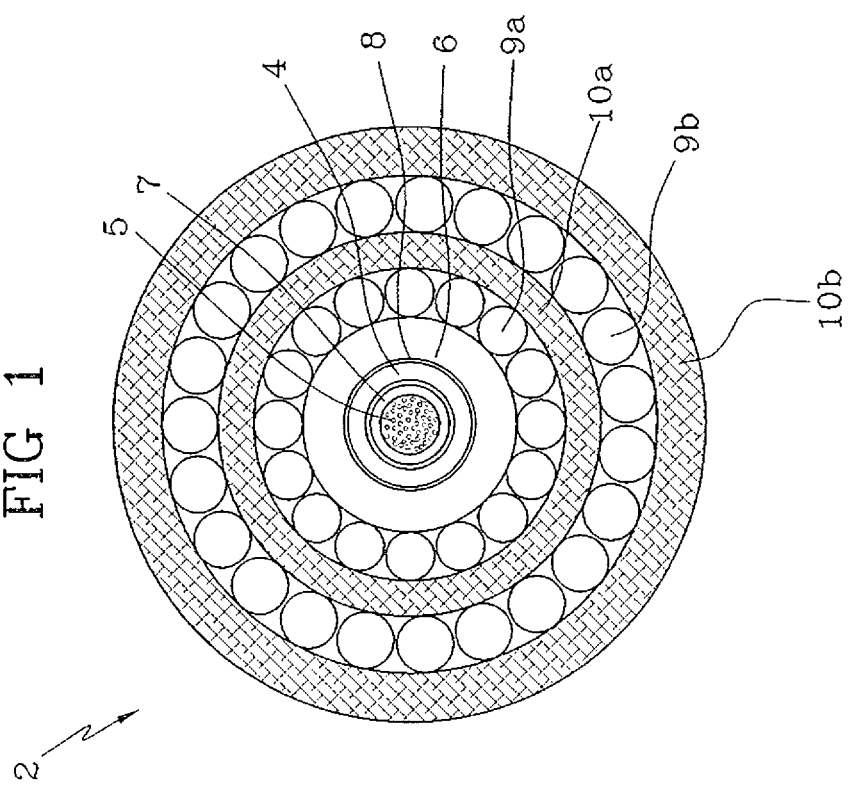
FIG. 2 is a schematic cross section of a further example of an underwater optical fibre cable along line I-I of FIG. 3.

When armour layers are provided, the extruded metal tube 4 is the metallic element closest to the bundle of optical fibres 5 starting from the centre of the cable. In FIG. 2 a further example of an underwater optical fibre cable 2 of the invention is shown. The cable of FIG. 2 differs from the cable of FIG. 1 for the fact that the cable of FIG. 2 fails to show a polymeric tube between the extruded metal tube 4 and the at least one optical fibre 5. In this configuration the extruded metal tube directly houses the optical fibres and, optionally, the filler material.

The extruded metal tube can have a linear longitudinal cross section or a corrugated longitudinal cross section forming a corrugated extruded metal tube.

The extruded metal tube 4 can comprise at least an exposed stretch 11 at least at one end portion of the cable as disclosed for example on FIG. 3. At least one end portion of the cable 2 comprises an exposed stretch 11 of the extruded metal tube 4, which is a stretch without radially external layer, therefore directly exposed to the environment. At least at one end portion of the cable, the cross section of the cable does not comprise further layers surrounding the extruded metal tube 4. For example the extruded metal tube 4 comprises an exposed stretch 11 for each end portion 3a and 3b of the cable 2.

FIG. 3 shows the length of the cable 2 having two end portions 3a and 3b and a controlled cathodic protection system 12. The controlled cathodic protection system is suitable for applying a protection current to the extruded metal tube 4 and is connected to the end portions 3a, 3b of the cable 2.

The underwater cable comprises at least one controlled cathodic protection system 12 connected to at least one of the end portions of the cable 2.

A "controlled" cathodic protection system is a cathodic protection working under control whereby the cathodic protection is reliable, avoiding corrosion of a metal tube housing the optical fibres, and is also not dangerous, limiting the hydrogen generation and therefore the attenuation of the optical fibres. In particular a controlled cathodic protection system is a protection which applies a controlled protection current to the metal tube housing the optical fibres. The controlled cathodic protection system 12 comprises an anode bed 13 arranged outside the cable and an electric connection 14 connecting the anode bed 13 to the extruded metal tube 4 of the cable 2 at the one of the end portions of the cable.

Both the cable 2 and the anode bed 13 are in contact with the sea water. The electric connection 14 can comprise an isolated wire.

The underwater optical fibre cable 2 comprises a predetermined electrical resistance suitable for maintaining the value of the protection current density J between 0.001 A/m$^2$ and 1 A/m$^2$. The predetermined electrical resistance is arranged between the anode bed and the extruded metal tube 4. For example the predetermined electrical resistance is suitable for maintaining the value of the protection current density J between 0.005 A/m$^2$ and 0.1 A/m$^2$. Preferably the predetermined electrical resistance is suitable for maintaining the value of the protection current density J between 0.008 A/m$^2$ and 0.05 A/m$^2$.

In particular the predetermined electrical resistance is suitable for maintaining the value of the protection current density J about 0.01 A/m$^2$±0.002 A/m$^2$.

The attenuation at the operating wavelengths for the life of a cable (40 years) is satisfactory and the controlled cathodic protection system is reliable.

For example the predetermined electrical resistance is arranged in series along the electrical connection 14. In case the extruded metal tube 4 comprises an exposed stretch 11 at the end portion of the underwater cable connected to the controlled cathodic protection system, the electric connection 14 of the controlled cathodic protection system 12 connects the anode bed 13 to the exposed stretch 11 of the extruded metal tube 4.

A joint case 15 housing the exposed stretch 11 of the extruded metal tube 4 can be provided. The electric connection 14 passes through the joint case 15. The anode bed 13 is outside the joint case, in contact with the sea water.

FIG. 3 shows a controlled cathodic protection system for each end portion 3a, 3b of the cable 2. Each controlled cathodic protection system 12 comprises a anode bed 13 arranged outside the cable and an electric connection 14 connecting the anode bed 13 to the extruded metal tube 4 of the cable 2 at the related end portion 3a, 3b of the underwater cable.

According to FIG. 3, the extruded metal tube 4 comprises an exposed stretch 11 for each end portion 3a, 3b of the cable 2. The electric connection 14 of each controlled cathodic protection system 12 connects the related anode bed 13 to the related exposed stretch 11 of the extruded metal tube 4.

Figure 4:
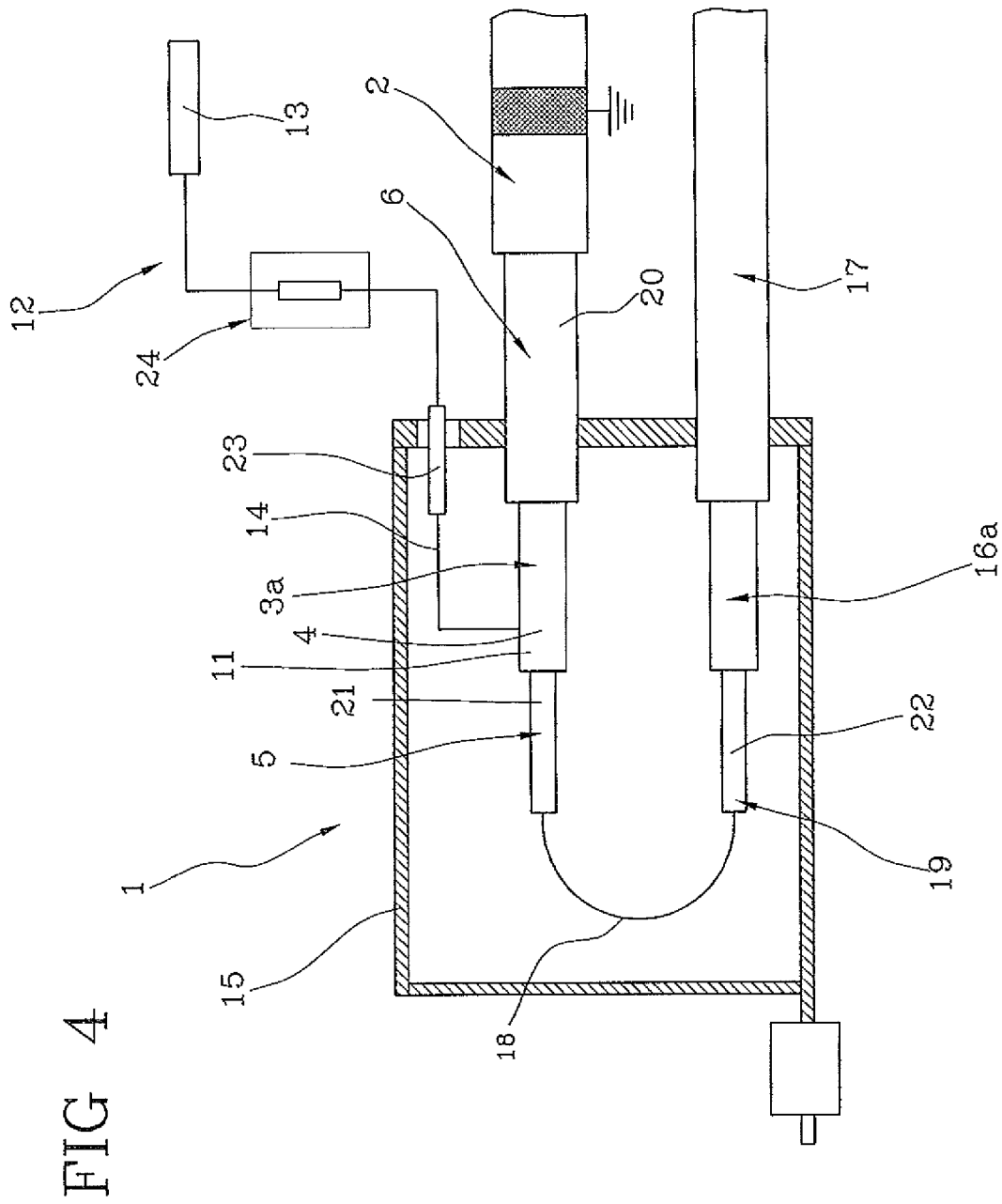
FIG. 4 is an enlarged schematic view of an example of a galvanic cathodic protection system.

According to FIG. 3, a joint case 15 for each end portion 3a, 3b of the underwater cable 2 is provided. Each joint case 15 houses the related exposed stretch 11 of the extruded metal tube 4. The related electric connection 14 passes through the related joint case 15. FIG. 4 shows an example in which at least one end portion 3a of the cable 1 is housed within the joint case 15 and is connected to the controlled cathodic protection system 12. The following description of FIG. 4 can be applied to the other end portion 3b of the cable 2.

The joint case 15 houses the end portions 3a of the cable 2 and an end portion 16a of a terrestrial optical cable 17. A link 18 connects the optical fibres 5 of the cable 2 to an optical core 19 of the terrestrial optical cable 17.

The end portion 3a of the cable 2 comprises the exposed stretch 11 of the extruded metal tube, an exposed stretch 20 of the polymeric sheath 6 and an exposed stretch 21 of the optical fibres 5. In particular the link 18 connects the exposed stretch 21 of the optical fibres 5 of the cable 2 to an exposed stretch 22 of the optical core 19 of the terrestrial optical cable 17. For example the joint case 15 houses all the length of the exposed stretch 21 of the optical fibres 5, all the length of the exposed stretch 11 of the extruded metal tube 4 and a length portion of the exposed stretch 20 of the polymeric sheath 6.

With reference to the controlled cathodic protection system 12, FIG. 4 shows an example in which the electric connection 14 comprises an insulated wire which passes through the joint case 5 with an insulated feedthrought 23.

The anode bed 13 can comprise two or more sacrificial anodes (not explicitly shown) connected in parallel to a link box 24. The link box 24 is connected to the extruded metal tube 4 of the cable 2 by means of the electric connection 14.

The end portion of the cable 2 provided with the controlled cathodic protection system 12 can be located by a shore and the anode bed 13 is suitable for being buried in the shore under water level. For example the two end portions 3a, 3b of the cable 2, each provided with the cathodic protection system 12, are respectively located by a shore and the anode bed 13 of each end portion 3a, 3b is suitable for being buried in the shore under water level.

The anode bed 13 can be buried with hydrophilic backfill (not shown).

Figure 5:
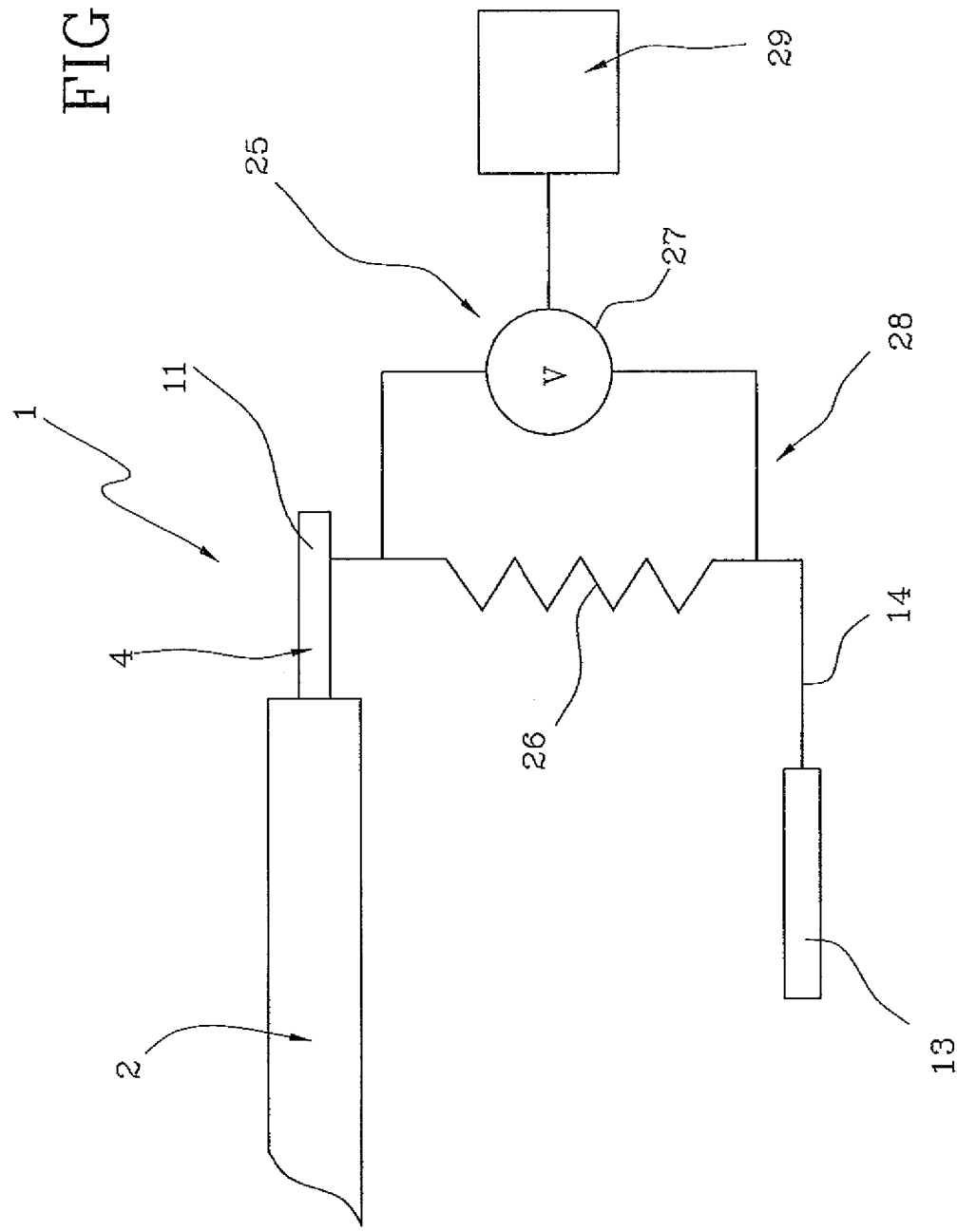
FIG. 5 is an enlarged schematic view of an example of a galvanic cathodic protection system.

With reference to FIG. 4 and FIG. 5, the controlled cathodic protection system 12 is a galvanic controlled cathodic protection system in which the anode bed 13 of the controlled cathodic protection system comprises at least one sacrificial anode made of a material with a more negative electrode potential than the extruded metal tube 4 of the cable 2. In particular the sacrificial anode is made of a material with a more negative electrode potential than the extruded metal tube with reference to the sea water.

For example the extruded metal tube 4 is made of aluminium and the at least one sacrificial anode of the anode bed 13 is made of a material selected from the group consisting of: zinc, magnesium, aluminium or aluminium alloy.

FIG. 5 shows an example of a galvanic controlled cathodic protection system in which a control system continuously checks the presence of defect of the polymeric sheath. The control system is connected to the electric connection 14 between the anode bed 13 and the extruded metal tube 4 in at least one of the end, portions of the underwater cable.

In particular the control system comprises an electric current evaluating device 25 suitable for evaluate the electric current supplied by the anode bed 13.

For example at least one element of the control system is placed in series within the electric connection 14 between the anode bed 13 and the extruded metal tube 4. In particular the control system comprises an electric resistance 26 in series along the electric connection 14 between the anode bed 13 and the extruded metal tube and a voltmeter 27 measuring electric potential difference at the ends of the electrical resistance 26. The electric current evaluating device comprises a gathering device for reading the electric potential difference 28 between the anode bed 13 and the extruded metal tube and a processing device 29 which receives the electric potential difference from the gathering device, processes the electric potential differences of a predetermined period to obtain an average value of the electric potential difference and processes the average value of the electric potential difference to obtain the value of the electric current supplied by the anode bed.

For example the gathering device 28 continuously reads the electric potential difference between the anode bed and the extruded metal tube 4. For example the electric current evaluating device 25 comprises a timer (not shown) functionally interrelated with the processing device 29 to select the values of the electric potential difference between the anode bed 13 and the extruded metal tube 4 with a predetermined frequency. Preferably the values of the electric potential difference between the anode bed 13 and the extruded metal tube 4 are selected with a 1 Hz frequency.

Alternatively the electric current evaluating device 25 can comprise a timer (not shown) functionally interrelated with the gathering device 28 to read the electric potential difference between the anode bed 13 and the extruded metal tube 4 with a predetermined frequency. Preferably the values of the electric potential difference between the anode bed 13 and the extruded metal tube 4 are read with a 1 Hz frequency. For example the gathering device 28 is connected to the electric connection 14 between the anode bed 13 and the extruded metal tube 4. In particular the gathering device 28 is placed in series within the electric connection 14 between the anode bed 13 and the extruded metal tube 4.

For example, as shown in FIG. 5, the gathering device 28 comprises the electric resistance 26 in series along the electric connection 14 between the anode bed 13 and the extruded metal tube 4 and the voltmeter 27 measuring electric potential difference at the end of the resistance.

For example the gathering device comprises a 1Ω electric resistance.

In case the processing device 29 is installed far from the gathering device 28, the electric current evaluating device can comprise a transmitter (not explicitly shown) with a power supplier functionally interrelated with the gathering device 28 and the processing device 29.

With reference to a galvanic controlled cathodic protection system of an aluminium extruded tube, it works as follows.

The polymeric sheath 6 protects the aluminium extruded tube 4 even if exposed to aggressive environment (sea water). Damages of the polymeric sheath 6 can expose the aluminium extruded tube 4 to the seawater (electrolyte) with the risk of corrosion of the exposed portion of the aluminium extruded tube 4 working as an anode with respect to the other parts of the aluminium extruded tube 4.

Considering an aluminium extruded tube 4 and a zinc anode bed, zinc has a lower electrode potential than aluminium in seawater. In case of damages of the polymeric sheath 6, the current will flow from the more positive aluminium extruded tube 4 to the more negative zinc bed 13 by means of the electric connection 14. The zinc anode bed is being corroded (oxidized) to positive $Zn^{++}$ ions that are lost in seawater leaving an excess of electrons in the metal that will go from the zinc anode bed to the aluminium extruded tube, opposite to the conventional current flow. At aluminium extruded tube surface two possible cathodic reactions can be active: 1) the oxygen gas dissolved in water is reduced to $OH^-$ ions that are lost in seawater too and 2) the reduction of hydrogen ions H+ present in water. This will produce $H_2$ gas leaving again an excess of $OH^-$ ions. Therefore the initial overall electrical neutrality is preserved: the aluminium extruded tube is protected and the zinc anode bed corrodes indefinitely.

FIG. 6 shows the results of test made on samples comprising an aluminium extruded tube with a polymeric sheath and optionally an adhesive layer. The samples (lines B-D) comprise a cathodic protection system having a zinc sacrificial anode. The sample E comprise an aluminium extruded tube without a cathodic protection system. All the samples and the sacrificial anode are in seawater and the polymeric sheath has been removed exposing a portion of the extruded aluminium tube. The test consists of measuring the electrode potential with respect to a saturated calomel reference electrode of the aluminium extruded tube. In particular FIG. 6 shows the electrode potential as a function of the time. Line A shows the zinc electrode potential. Lines B-D shows the electrode potential of a sample with cathodic protection and different resistances in series. Line E shows the electrode potential of a sample without a cathodic protection. Lines B-D follow strictly the zinc electrode potential and remains always in the protection zone that has been found to be the interval from −1 V and −1.1 V with respect to a saturated calomel reference electrode as shown in the enlarged portion of the graph of FIG. 6a. Line E is always in a zone of lower negative potential (beyond −0.9 V) in which the extruded metal tube corrodes. The test has been performed for over 3000 hours with the conclusion that the sample without a cathodic protection system has a strong crevice corrosion while the samples with a cathodic protection system are not corroded. The test results of the extruded aluminium tube exposure to seawater may be summarized as follows: with Zn anode there is no corrosion both after 1770 hours and after 3140 hours; without Zn anode there is a corrosion of 28% of thickness after 1770 hours and of 39% thickness after 3140 hours.

Moreover the presence of a cathodic protection can induce a hydrogen generation. The extruded tube has a low permeability to hydrogen and it is further protect maintaining the value of the protection current density J as stated below. The ranges disclosed allow a low generation of hydrogen and therefore a low attenuation of the optical fibres but are suitable for obtaining a reliable controlled cathodic protection.

With reference to a galvanic controlled cathodic protection system according to FIG. 5, it is provided for a continuous check of the presence of defect of the polymeric sheath evaluating the electric current supplied by the anode bed.

The processing device evaluates the electric current supplied by the anode bed starting from an average electric potential difference between the anode bed and the extruded metal tube.

In particular the gathering device reads the electric potential difference between the anode bed and the extruded metal tube. Then the processing device processes the electric potential differences of a predetermined period (for example two weeks) to obtain an average value of the electric potential difference. The processing device processes the average value of the electric potential difference to obtain the value of the electric current supplied by the anode bed.

In order to eliminate variation of the electric potential difference due to the environment (i.e. sea fluctuations) the gathering device can continuously read the electric potential difference between the anode bed and the extruded metal tube but the values of the electric potential difference between the anode bed and the extruded metal tube are selected with a predetermined frequency, for example with a 1 Hz frequency.

Alternatively, in order to eliminate variation of the electric potential difference due to the environment (i.e. sea fluctuations) the gathering device can directly read the electric potential difference between the anode bed and the extruded metal tube with a predetermined frequency, for example with a 1 Hz frequency.

In order to eliminate constant errors due to the different geological composition of the environment at the two end portions of the underwater cable, the processing device subtracts a continuous value related to the geological composition of the environment at the two end portions of the underwater cable.

According to the galvanic controlled cathodic protection system, the end portion of the cable provided with the controlled cathodic protection system is located by a shore and the anode bed is buried in the shore under water level. Preferably the two end portions of the cable, each provided with the controlled cathodic protection system, are located by a shore and the related anode bed are buried in the shore under water level.

Figure 7:
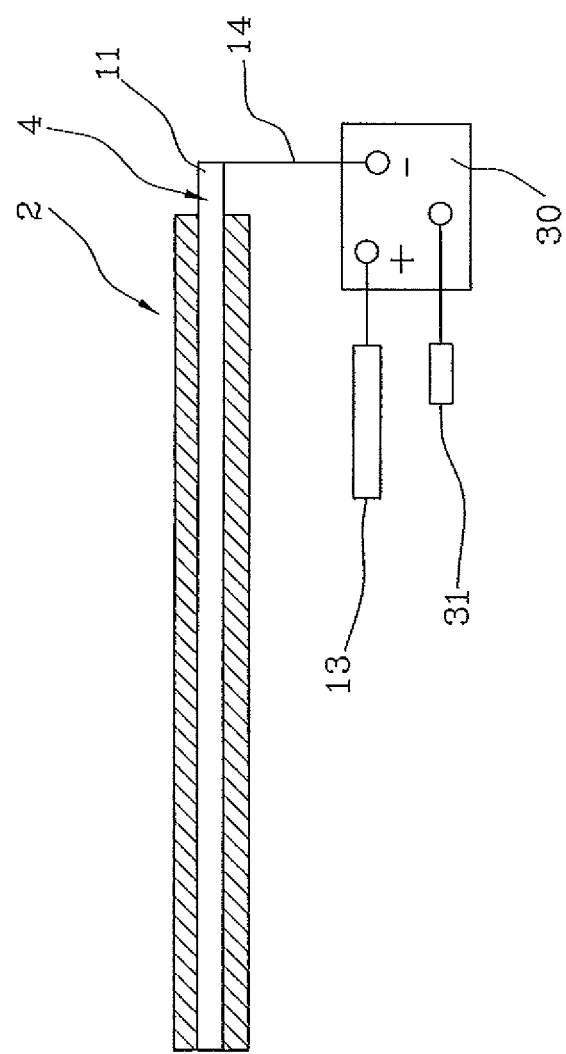
FIG. 7 is a schematic view of an example of a impressed current protection system.

FIG. 7 shows an example of the invention in which the cathodic protection system is an impressed current controlled cathodic protection system comprising an external power source disposed along the electric connection 14 between the anode bed 13 and the extruded metal tube 4 of the cable 2. Preferably the external power source comprises an AC or DC powered rectifier 30 having a positive terminal connected to the anode bed 13, a negative terminal connected to the extruded metal tube 4 of the underwater cable and a further terminal connected to a reference electrode 31.

Advantageously the AC powered rectifier comprises comparing device (not explicitly shown) which compares the electric potential difference between the reference electrode 31 and the extruded metal tube 4 with a reference value.

According to the impressed current controlled cathodic protection system, the end portion of the cable provided with the cathodic protection system is located by a shore and the anode bed is buried in the shore under water level. Preferably the two end portions of the cable, each provided with the cathodic protection system, are located by a shore and the related anode bed are buried in the shore under water level.

The anode bed is connected to the extruded metal tube of the cable by means of the electric connection and the current is driven from the extruded metal tube to the anode bed by means of the external power source. The electric potential difference between the reference electrode and the extruded metal tube may be compared with a reference value, whereby the current is driven from the extruded metal tube to the anode bed by means of the external power source if the electric potential difference between the reference electrode and the extruded metal tube and the reference value are different.

A method for protecting an underwater optical fibre cable is now described. The cable 2 has two end portions 3a, 3b and comprises the extruded metal tube 4, at least one fibre, or a plurality of fibres 5, preferably provided in a bundle of fibres 5 loosely housed within the extruded metal tube 4 and a polymeric sheath 6 surrounding the extruded metal tube 4.

In particular the method for protecting an underwater optical fibre cable comprises:

providing for a controlled cathodic protection system suitable for applying a protection current to the extruded metal tube 4, connecting one anode bed to the extruded metal tube of the underwater cable at least at one of the end portions of the underwater cable by means of a electric connection, the anode bed (13) being arranged outside the underwater cable. The method for protecting comprises:

continuously checking the presence of defects of the polymeric sheath 6, in particular evaluating the electric current supplied by the anode bed 13. In case of electric current supplied by the anode bed 13 there is at least a defect in the polymeric sheath 6.

The anode bed is made of a material with a more negative electrode potential than the extruded metal tube of the underwater cable. Advantageously the method for protecting an underwater optical fibre cable applies a controlled galvanic cathodic protection. Alternatively the method for protecting an underwater optical fibre cable applies a controlled impressed current cathodic protection.

For example the electric current supplied by the anode bed 13 is evaluated starting from an average electric potential difference between the anode bed 13 and the extruded metal tube 4.

For example the method comprises: reading the electric potential difference between the anode bed 13 and the extruded metal tube 4, processing the electric potential differences of a predetermined period to obtain an average value of the electric potential difference, and processing the average value of the electric potential difference to obtain the value of the electric current supplied by the anode bed.

The average value of the electric potential difference is obtained processing the electric potential differences of a predetermined period of at least two weeks.

The electric potential difference between the anode bed and the extruded metal tube 4 can be continuously read. The values of the electric potential difference between the anode bed 13 and the extruded metal tube 4 are selected with a predetermined frequency. For example the values of the electric potential difference between the anode bed 13 and the extruded metal tube 4 are selected with a 1 Hz frequency.

Alternatively, the electric potential difference between the anode bed 13 and the extruded metal tube 4 is read with a predetermined frequency. For example the electric potential difference between the anode bed 13 and the extruded metal tube 4 is read with a 1 Hz frequency.

A continuous value related to the geological composition of the environment at the two end portions of the underwater cable can be subtracted from the values of the electric potential difference between the anode bed and the extruded metal tube.

The invention claimed is:

1. An underwater optical fibre cable comprising:
    two end portions;
    an extruded metal tube;
    at least one loosely housed optical fibre within the extruded metal tube;
    a polymeric sheath surrounding the extruded metal tube; and
    a controlled cathodic protection system comprising an anode bed arranged outside the underwater cable and an electric connection connecting the anode bed to the extruded metal tube of the underwater cable at one of the end portions of the underwater cable.

2. The underwater optical fibre cable according to claim 1, comprising a controlled cathodic protection system for each end portion of the underwater cable, each controlled cathodic protection system comprising an anode bed arranged outside the underwater cable and an electric connection connecting the anode bed to the extruded metal tube of the underwater cable at a related end portion of the underwater cable.

3. The underwater optical fibre cable according to claim 1, wherein the underwater cable comprises at least one adhesive layer disposed between the extruded metal tube and the polymeric sheath.

4. The underwater optical fibre cable according to claim 3, wherein the adhesive layer comprises maleic anhydride grafted polyethylene.

5. The underwater optical fibre cable according to claim 1, comprising a predetermined electrical resistance suitable for maintaining a value of a protection current density between $0.001$ $A/m^2$ and $1$ $A/m^2$, said electrical resistance being arranged between the anode bed and the extruded metal tube.

6. The underwater optical fibre cable according to claim 5, wherein the predetermined electrical resistance is capable of maintaining the value of the protection current density between $0.005$ $A/m^2$ and $0.1$ $A/m^2$.

7. The underwater optical fibre cable according to claim 5, wherein the predetermined electrical resistance is capable of maintaining the value of the protection current density between $0.008$ $A/m^2$ and $0.05$ $A/m^2$.

8. The underwater optical fibre cable according to claim 1, wherein the predetermined electrical resistance is arranged in series along the electrical connection.

9. The underwater optical fibre cable according to claim 1, wherein the underwater cable comprises a polymeric tube housing said at least one optical fibre within said extruded metal tube.

10. The underwater optical fibre cable according to claim 1, wherein the extruded metal tube is the metallic element closest to the at least one optical fibre starting from a centre of the cable.

11. The underwater optical fibre cable according to claim 1, wherein the extruded metal tube comprises aluminium.

12. The underwater optical fibre cable according to claim 1, wherein at least a portion of the underwater cable comprises at least one layer of armour wires surrounding the polymeric sheath and at least one polymeric protective layer surrounding the armour wires.

13. The underwater optical fibre cable according to claim 1, wherein the controlled cathodic protection system is a galvanic cathodic protection system wherein the anode bed comprises at least one sacrificial anode made of a material with a more negative electrode potential than the extruded metal tube of the underwater cable.

14. The underwater optical fibre cable according to claim 1, wherein the controlled cathodic protection system is an impressed current controlled cathodic protection system comprising an external power source disposed along the electric connection between the anode bed and the extruded metal tube of the underwater cable.

15. The underwater optical fibre cable according to claim 1, wherein the extruded metal tube is made of aluminium and the anode bed is made of a material selected from zinc, magnesium, aluminium, and aluminium alloy.

16. The underwater optical fibre cable according to claim 1, comprising an electric resistance in series along the electric connection between the anode bed and the extruded metal tube and a voltmeter which measures electric potential difference at ends of the electric resistance.

17. A method for protecting an underwater optical fibre cable comprising an underwater cable comprising two end portions, an extruded metal tube, at least one loosely housed optical fibre within the extruded metal tube, and a polymeric sheath surrounding the extruded metal tube, comprising:
    providing a controlled cathodic protection system capable of applying a protection current to the extruded metal tube;
    connecting one anode bed to the extruded metal tube of the underwater cable at least at one of the end portions of the underwater cable by means of an electric connection, the anode bed being arranged outside the underwater cable; and
    checking for a presence of a defect in the polymeric sheath.

18. The method for protecting an underwater optical fibre cable according to claim 17, comprising evaluating an electric current supplied by the anode bed.

19. The method for protecting an underwater optical fibre cable according to claim 17, comprising:
    evaluating an electric current supplied by the anode bed starting from an average electric potential difference between the anode bed and the extruded metal tube.

20. The method for protecting an underwater optical fibre cable according to claim 19, comprising:
    reading an electric potential difference between the anode bed and the extruded metal tube; and
    processing electric potential differences of a predetermined period to obtain an average value of the electric potential difference, and processing the average value of the electric potential difference to obtain a value of the electric current supplied by the anode bed.

21. The method for protecting an underwater optical fibre cable according to claim 20, comprising:
    reading the electric potential difference between the anode bed and the extruded metal tube.

22. The method for protecting an underwater optical fibre cable according to claim 21, comprising:
    subtracting a continuous value related to geological composition of the environment at the two end portions of the underwater cable.

23. The method for protecting an underwater optical fibre cable according to claim 17, wherein the controlled cathodic protection system is a galvanic cathodic protection system wherein the anode bed is made of a material with a more negative electrode potential than the extruded metal tube of the underwater cable.

\* \* \* \* \*